Oct. 25, 1949.  D. W. MAIN  2,485,976
HYDRAULIC CONNECTOR
Filed March 8, 1946
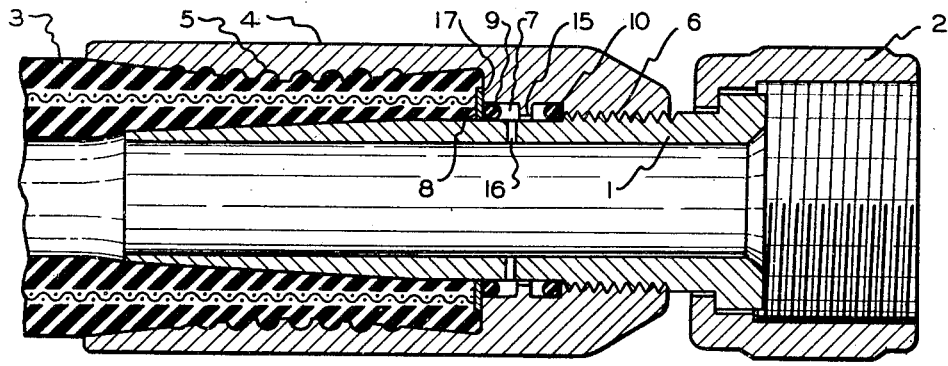
FIG. I.
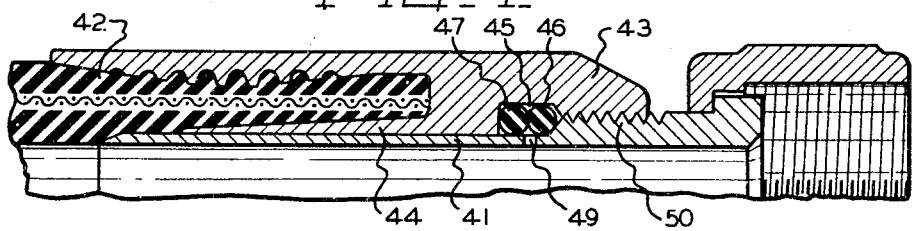
FIG. II.
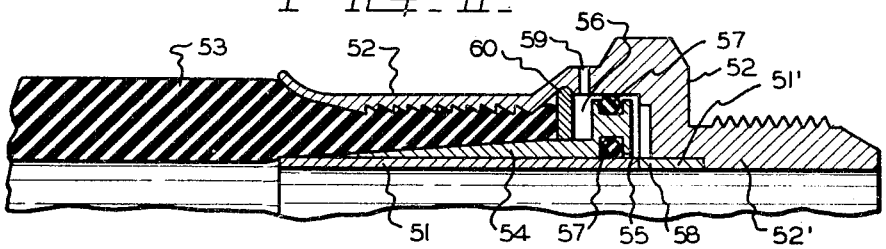
FIG. III.
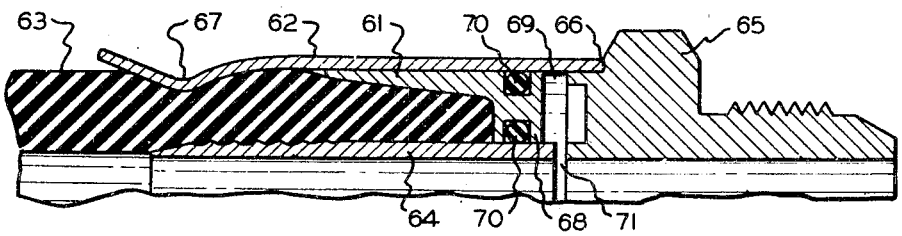
FIG. IV.
Inventor
DONALD W. MAIN
By Beaman & Patch Patented Oct. 25, 1949

2,485,976

UNITED STATES PATENT OFFICE 2,485,976

HYDRAULIC CONNECTOR

Donald W. Main, Jackson, Mich., assignor, by mesne assignments, to Aeroquip Corporation, Jackson, Mich., a corporation of Michigan Application March 8, 1946, Serial No. 652,996

3 Claims. (Cl. 285—84)

The present invention relates to connectors and more particularly to connectors wherein a hose or the like is clamped between a nipple and a ferrule.

The function of the ferrule in connectors of the character described is not only to hold the hose against separation from the nipple, but is also for preventing the leakage of fluid from within the hose between the nipple and the hose or the like. The present invention provides structure for increasing the effectiveness of the seal between the nipple and the ferrule.

An object of the invention is to provide a leakproof seal between a nipple and hose.

Another object of the invention is to employ a resilient ring between the ferrule and nipple between which is disposed one end of a hose, sealing the connection against leakage.

Another object of the invention is to provide a sealing structure between the nipple and the ferrule in a connector of the character described wherein the fluid pressure from within the nipple is employed to increase the effectiveness of the seal.

Still another object of the invention is to provide a pair of resilient rings between the nipple and ferrule of a connector of the character described wherein fluid from within the nipple is conducted to the space between the rings to increase the effectiveness of the sealing action afforded by the rings.

Still another object of the invention is to provide in a connector of the character described, an annular wedge associated with an annular sealing ring subjected to pressure from within the nipple, to increase the effectiveness of the seal between the nipple and the hose disposed thereon.

These and other objects residing in the arrangement, combination, and construction of parts will be apparent from the following specification when taken with the accompanying drawings, in which Fig. 1 is a vertical section of one embodiment of the invention, and Figs. 2, 3 and 4 are partial vertical sections of other embodiments of the invention.

Referring particularly to the drawings, the reference character 1 indicates a nipple on which is mounted a connection nut 2. Spread over the end of the nipple opposite the nut 2 is a flexible hose or the like 3. The hose 3 is secured on the nipple by a ferrule 4. The grip between the hose 3 and the ferrule 4 is increased by the employment of the serrations 5 of a conventional nature. The ferrule 4 in the form of the invention disclosed in Fig. 1 is secured by threads 6 to the nipple 1. However, the threaded relationship between the ferrule 4 and the nipple 1 is not an essential feature of the invention in its broadest aspects.

While the action of the ferrule 4 against the hose 3 is sufficient to retain it from separation from the nipple 1, it is not sufficient in all cases to prevent the leakage of fluid from within the hose 3 between the hose 3 and the nipple 1. It is in order to prevent this leakage that the present invention has been designed. Between the ferrule 4 and the nipple 1 is arranged a cavity 7 which has one end thereof defined by the end portion 8 of the hose, or the like, 3.

Arranged in the cavity 7 are sealing rings 9 and 10. The sealing rings 9 and 10 are disposed at opposite ends of the cavity 7, and are preferably of the type known as O. They are generally of synthetic rubber and are of a suitable consistency to permit them to flex under pressure into sealing relation with the walls with which they are in contact.

The cavity 7 is divided into two parts by a spacer 15, which is shown in Fig. 1 as being integral with the ferrule 4. The spacer 15 does not quite reach the opposite side of the cavity 7, that is, it does not come into contact with the nipple 1, so as to permit the equalization of fluid pressure within all parts of the cavity 7. A port 16 is disposed in the nipple 1 providing communication between the interior of the nipple 1 and the chamber 7. While only two ports 16 are shown, it will be understood that the number of ports 16 is not critical so long as fluid pressure communication between the interior of the nipple 1 and the cavity 7 is maintained.

In operation, fluid pressure within the nipple 1 passing through the ports 16 tends to force the sealing rings 9 and 10 outwardly as viewed in Fig. 1. The sealing ring 9 bears against a steel washer 17, placed against the end of the hose 3 to distribute the force exerted by the ring 9 over a larger area of the end 8 of the hose 3. The pressure against the ring 9 forces the ring 9 against the steel plate 17, the nipple 1 and the ferrule 4 to seal all openings through which communication might be established from the interior of the nipple 1 and hose 3 outwardly past the connection provided by the nipple 1 and the ferrule 4 with the hose 3. The pressure within the cavity 7 likewise forces the ring 10 to the right as viewed in Fig. 1 urging the same into sealing relation with the connection between the nipple 1 and the ferrule 4. The spacer 15 serves to maintain the rings 9 and 10 on opposite sides of the port 16.

It will be clear that the present invention greatly improves the seal over that provided by the usual nipple and ferrule connection with a hose, thereby permitting fluid of higher pressures to be carried by the hose 3. The structure disclosed in Fig. 1 constitutes one example of a form the invention may take. Other forms of the invention are shown by the other figures of the drawing.

Another form of the invention is disclosed in Fig. 2. In this form of the invention, a nipple 41 has disposed thereon a hose 42, or the like, the hose or the like 42 being clamped to the nipple 41 by a ferrule 43. The structure of Fig. 2 is somewhat different from that disclosed in Fig. 1, in that there is provided between a portion of the nipple 41 and the hose 42, an annular wedge 44. Between the ferrule 43 and the nipple 41 is provided an annular cavity 45 which is similar to the other cavities hereinabove described with the exception, however, that between the sealing rings 46 and 47 therein, which are of the O type, there is no spacer; the sealing rings 46 and 47 being adjacent each other. A port 49 provides communication between the interior of the nipple 41 and the cavity 45. The ferrule is secured to the nipple 41 by a threaded connection 50.

The operation of the invention disclosed in Fig. 2 is such that fluid pressure from within the nipple 41 passes through the port 49 into the cavity 45 to urge the sealing rings 46 and 47 apart. Sealing ring 46 is urged against the threaded connection 50 to seal the same against any passage of fluid while the sealing ring 47 bears against the wedge 44 to urge the same further into a wedging relation with the hose 42 and the nipple 41, and at the same time provides an effective seal between the sides of the cavity 45 and the inner end of the wedge 44. It will be understood that in this form of the invention the additional stress imposed upon the annular wedge 44 by the pressure within the coupling and forcing it into further wedging relation between the hose 42 and the nipple 41 causes an effective seal between the nipple 41 and the hose 42 or the like.

Another form of the invention is disclosed in Fig. 3 wherein a nipple 51 is provided with an integral ferrule 52 which is formed into a clamping relation with the hose 53 in some suitable manner as by swaging. The nipple 51 preferably is formed by swaging a tube 51' to a connector 52'. Disposed around the nipple 51 is an annular wedge 54. The wedge 54 is provided with an annular foot portion 55 axially slidable in an annular cavity 56. A seal is maintained between the cylindrical walls of the cavity 56 by sealing rings 57 of the O type. One or more ports 58 are arranged in the nipple 51 for providing communication between the interior of the nipple 51 and the cavity 56. Also, one or more ports 59 are provided in the ferrule 52 for providing communication between the atmosphere and the cavity 56. A washer 60 is provided in the cavity 56 adjacent the inner end of the hose 53 to limit the inner movement of the hose 53 due to its being squeezed by the nipple 51 and the ferrule 52.

In the operation of the form of the invention disclosed in Fig. 3, fluid pressure from within the nipple 51 engages with the annular foot portion 55 to force the wedge 54 axially between the nipple 51 and the ferrule 52 to increase the radial pressure against the portion of the hose 53 within the ferrule 52. The port 59 serves to permit the escape of air from the portion of the cavity 56 between the annular foot portion 55 and the washer 60 during axial movement of the wedge 54 under the action of fluid pressure from within the nipple 51.

Another form of the invention is disclosed in Fig. 4 and is somewhat similar to the disclosure of Fig. 3 except that the wedge 61 therein extends between the ferrule 62 and the hose 63 rather than between the nipple 64 and the hose 63. In Fig. 4 the ferrule 62 is arranged to be swaged onto the hose 63 and preferably is secured to the connector 65 as by brazing at the connection 66. The swaged portion 67 of the ferrule 62 should be sufficiently spaced from the end of the wedge 61 so as to provide a cylindrical portion within which the wedge 61 may act.

The wedge 61 is provided with a foot portion 68 similar to the foot portion 55 of Fig. 6. The foot portion 68 is arranged to slide in an annular cavity 69 and is provided with sealing rings 70 of the O type. Port or ports 71 provide communication between the interior of the nipple 64 and the cavity 69.

The operation of the form of the invention disclosed in Fig. 4 is similar to that disclosed in Fig. 3 in that pressure from within the nipple 64 urges the wedge 61 axially to increase the pressure on the hose 63 between the ferrule 62 and the nipple 64. It will be understood that the wedges in the forms of the invention disclosed in both Figs. 3 and 4 are inserted in their respective ferrules prior to the ferrules being swaged.

The various forms of the invention which have been disclosed illustrate various specific forms which the invention may take. It will be apparent that there may be other specific forms which the invention may take which have not been disclosed herein. The reference to a hose includes tubing and other like articles of any suitable composition which are adaptable for use with the invention.

Having thus described my invention, what I desire to secure by Letters Patent and claim is:

1. In a socket-nipple end fitting for flexible hose, said hose having an end portion clamped between the nipple and socket, an annular cavity defined between said nipple and socket in axially adjacent relationship to the inner end of the clamped hose, port means through the wall of said cavity providing fluid flow communication between its interior and the nipple interior, a first sealing means in said cavity between said port means and said inner end of the hose, and a second sealing means between the socket and the nipple, said sealing means being adapted to be acted upon by the admitted fluid pressure to increase their sealing action.

2. In a socket-nipple end fitting as defined in claim 1, an annular wedge slidable in said cavity between one wall of the latter and said clamped hose end, said first sealing means operating against said wedge to increase its grip on the hose end.

3. In a socket-nipple end fitting as defined in claim 1, an annular wedge slidable in said cavity between one wall of the latter and the clamped hose end, and an annular piston incorporated in one end of said annular wedge and operable in said annular cavity, both said sealing means being provided upon said annular position in position to effect their respective seals and said piston defining one end of said cavity.

DONALD W. MAIN.

REFERENCES CITED

The following references are of record in the file of this patent:

UNITED STATES PATENTS

| Number | Name | Date |
|---|---|---|
| 2,373,280 | Weber | Apr. 10, 1945 |

FOREIGN PATENTS

| Number | Country | Date |
|---|---|---|
| 582,326 | France | June 4, 1924 |